United States Patent [19]

Manning et al.

[11] 4,166,400

[45] Sep. 4, 1979

[54] MOTOR VEHICLE STEERING WHEEL ASSEMBLY

[75] Inventors: Walter Manning, Little Baddow; Terry G. Bradley, Chelmsford, both of England

[73] Assignee: Ford Motor Company, Dearborn, Mich.

[21] Appl. No.: 847,984

[22] Filed: Nov. 2, 1977

[30] Foreign Application Priority Data

Feb. 9, 1977 [GB] United Kingdom ............... 05272/77

[51] Int. Cl.² .............................................. B62D 1/08
[52] U.S. Cl. ........................................ 74/552; 74/493; 403/218
[58] Field of Search .......................... 74/492, 493, 552; 248/188.7; 403/218

[56] References Cited

U.S. PATENT DOCUMENTS

| 2,179,013 | 11/1939 | Kaye | 74/552 |
| 2,218,583 | 10/1940 | Marthaler | 248/188.7 |
| 2,664,320 | 12/1953 | Fox | 403/218 |
| 3,244,128 | 4/1966 | Rogalski et al. | 248/188.7 X |
| 3,245,720 | 4/1966 | Wenger | 248/188.7 X |
| 3,412,983 | 11/1968 | Kesilman et al. | 403/218 X |

Primary Examiner—Allan D. Herrmann
Attorney, Agent, or Firm—John J. Roethel; Keith L. Zerschling

[57] ABSTRACT

A steering wheel assembly comprising a wheel rim and a tubular member for use as at least a part of a steering column. The tubular member has its longitudinal axis aligned with the center of the wheel rim. A plurality of spokes each has a first portion extending from the rim transversely of the tubular member axis to a location adjacent the axis and a second portion extending parallel to the axis. The second portions are secured within the tubular members. The effect is that the upper steering shaft or tubular member is permanently fixed to the steering wheel resulting in reduced manufacturing cost and reduced assembly time.

6 Claims, 3 Drawing Figures

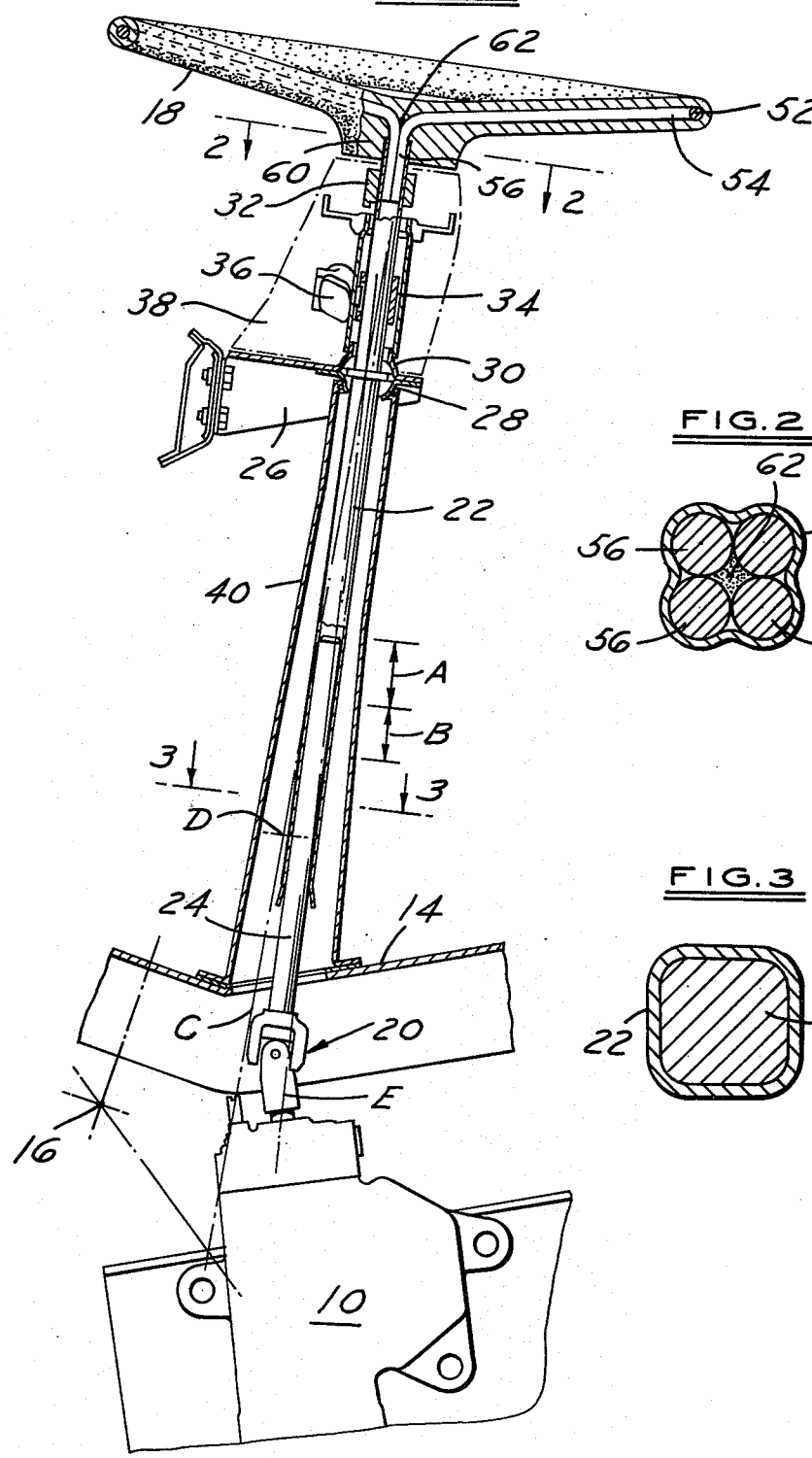
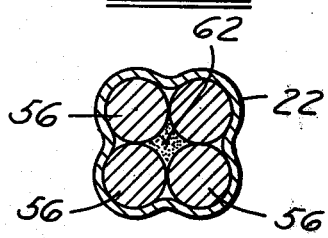
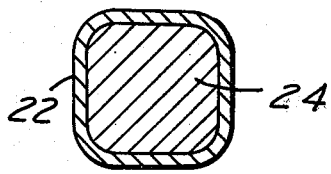

MOTOR VEHICLE STEERING WHEEL ASSEMBLY

BACKGROUND OF THE INVENTION

This invention relates to a steering wheel assembly for use in motor vehicles.

The usual practice in vehicles is to employ a steering wheel having a rim and a hub joined by a number of spokes, the hub being removably secured to the upper end of a steering column. Commonly, this securement is by means of cooperating splines on the column and the hub for rotational coupling, and a nut bearing on the hub and engaging a screw thread on the column. Such arrangements are relatively complex and costly to produce.

An object of the present invention is to provide an improved steering wheel assembly which is simple and cheap to produce.

SUMMARY OF THE INVENTION

The invention accordingly provides a steering wheel assembly comprising a wheel rim and a tubular member for use as at least a part of a steering column. The tubular member has its longitudinal axis aligned with the center of the wheel rim. A plurality of spokes each has a first portion extending from the rim transversely of said axis to a location adjacent the axis and a second portion extending parallel to said axis, the second portions of the spokes being secured within the tubular member.

DESCRIPTION OF THE DRAWINGS

An embodiment of the invention will now be described, by way of example, with reference to the accompanying drawings, in which:

FIG. 1 is a side elevation largely in cross-section of an assembly embodying the invention;

FIG. 2 is a view of part of the assembly, taken on the line 2—2 of FIG. 1; and

FIG. 3 is a cross-section on the line 3—3 of FIG. 1.

DETAILED DESCRIPTION OF THE INVENTION

Referring to FIG. 1, a steering wheel includes a number, in this embodiment four, of steel rods 50. Each rod 50 is bent to provide a part-circular portion 52, a generally radial portion 54, and an axial portion 56. The portions 52 together form a substantially closed rim, while the portions 54 form spokes extending from the rim to the center of the assembly. The four axial portions 56 nest together in a square formation.

A steering column includes a tube 22 of generally square section (see FIG. 3). The straight sides of the tube 22 are joined by radii equal to the outer radius of the rods 50. The nested axial portions 56 of the rods 50 are received within the upper end of the tube 22, which is crimped tightly around the portions 56, as seen in FIG. 2. A unitary plastics moulding 60 is formed around the rods 50 and the upper end of the tube 22 to provide an integral wheel and column assembly. The crimping of the tube 22 and the plastics moulding 60 give a suitable connection between the wheel and the column.

A weld 62 may be made between the rods 50 at the transition from the radial to the axial portions before the moulding 60 is formed to hold the rods in the correct relative positions during assembly and to impart additional strength.

In the preferred embodiment of FIG. 1, the integral assembly of steering wheel and tube 22 is mounted in a truck tilt cab as will now be described.

A steering box 10 is secured to a chassis member 12 of a truck. A cab, the floor of which is seen at 14, is mounted on the chassis to tilt about pivot axis 16. A steering wheel 18 is drivingly connected by a steering column assembly to be described and by a universal joint 20 to the steering box 10. FIG. 1 shows these element in the normal position of the cab. A rod 24 of complementary section is received within the lower end of the tube 22. A bracket 26 secured to the cab body provides a part-spherical seat 28 in which is received a part-spherical plastics body 30 which acts as a bearing for the tube 22 and accommodates not only rotation but also limited tilting movement. The tube 22 also carries a direction indicator cam 32 and a steering lock casting 34 for receiving the latch of a steering lock 36. A shroud 38 carried by the bracket 26 covers the upper part of the assembly, while the lower part is housed within a flared casing 40 fixed to the floor 14.

A length A of the tube 22 is formed to have a precisely dimensioned internal surface exactly interfitting with the rod 24. The top section of the rod 24 which is received in the length A in normal use, as seen in FIG. 2, is coated with a low friction material such as a polytetrafluoroethylene compound, of which Dupont's Teflon is an example.

Below this, a length B of the tube is opened out to give a maximum clearance of 0.5 mm. In this way, the use of relatively expensive tube having an accurately-sized interior surface over the whole of its length is avoided, while still giving good coupling for steering.

The lengths A and B may be formed as described in our co-pending application Ser. No. 847,985 filed Nov. 2, 1977 to which attention is directed.

If necessary, the rod 24 may be machined accurately to size on only the corresponding length.

In FIG. 2, the line C denotes the axis of the rod 24 and tube 22 with the cab tilted, the position of the top of the rod 24 being indicated at D, while the line E shows the limit of movement of the members in the opposite direction during tilting.

In assembly of the vehicle, the tube 22 with steering wheel 18 attached is assembled with the direction indicator cam 32, the steering lock casting 34, and the bracket 26 and bearing body 30. This assembly is then positioned with the tube 22 received on the rod 24, and the bracket 26 is bolted to the cab body.

It is of course possible to use the integral wheel and column member of the present invention in applications other than that shown in FIG. 1. For example, the column member could be attached to a lower column member via a coupling which shears on impact. A differing number of spokes may be used, and the shape of the tube 22 altered accordingly. Alternatively, a plain circular-section tube may be used and the coupling of its lower end altered accordingly.

What we claim is:

1. A steering wheel assembly comprising a wheel rim and a tubular member for use as at least part of a steering column, the tubular member having its longitudinal axis aligned with the center of the wheel rim, and a plurality of spokes of circular cross section each having a first portion extending from the rim transversely of said axis to a location adjacent the axis and a second portion extending parallel to said axis, the cross section of the tubular member having a number of flat sides equal to the number of spokes and joined by radii equal to the spoke cross-sectional radius, the second portions of the spokes being secured within the tubular member.

2. An assembly as in claim 1, in which the tubular member is crimped around said second portions.

3. An assembly as in claim 2, in which a weld is made between the spokes at the transition between said first and second portions.

4. A steering wheel assembly comprising a wheel rim and a tubular member for use as at least part of a steering column, the tubular member having its longitudinal axis aligned with the center of the wheel rim, and a plurality of spokes each having a first portion extending from the rim transversely of said axis to a location adjacent the axis and a second portion extending parallel to said axis, the second portions of the spokes being secured within the tubular member, the tubular member being crimped around said second portions.

5. An assembly as in claim 4, in which a weld is made between the spokes at the transition between said first and second portions.

6. A steering wheel assembly comprising a wheel rim and a tubular member for use as at least part of a steering column, the tubular member having its longitudinal axis aligned with the center of the wheel rim, and a plurality of spokes each having a first portion extending from the rim transversely of said axis to a location adjacent the axis and a second portion extending parallel to said axis, the second portions of the spokes being secured within the tubular member, the spokes being welded together at the transition between said first and second portions.

* * * * *